United States Patent [19]
Cloud

[11] Patent Number: 5,876,546
[45] Date of Patent: Mar. 2, 1999

[54] METHOD FOR FORMING INNER MOLD LINE TOOLING WITHOUT A PART MODEL

[75] Inventor: David J. Cloud, Bethel Township, Pa.

[73] Assignee: The Boeing Company, Seattle, Wash.

[21] Appl. No.: 937,855

[22] Filed: Sep. 25, 1997

[51] Int. Cl.[6] .................................................. B29C 43/56
[52] U.S. Cl. .......................................... 156/212; 156/245
[58] Field of Search .................................... 156/212, 245; 264/220

[56] References Cited

U.S. PATENT DOCUMENTS

| | | | |
|---|---|---|---|
| 5,071,338 | 12/1991 | Dublinski et al. | 425/403 |
| 5,242,523 | 9/1993 | Willden et al. | |
| 5,520,532 | 5/1996 | Reinfelder et al. | 425/500 |
| 5,683,646 | 11/1997 | Reiling | 264/512 |
| 5,773,047 | 6/1998 | Cloud | |

*Primary Examiner*—Michael W. Ball
*Assistant Examiner*—Barbara J. Musser
*Attorney, Agent, or Firm*—Christensen O'Connor Johnson & Kindness PLLC

[57] ABSTRACT

A method of forming a caul plate (14) for use in producing a composite honeycomb core sandwich panel (27). The uncured honeycomb core sandwich panel (27) is laid-up on a lay-up mandrel (20). An inner bagging film (28) is then extended over the uncured honeycomb core sandwich panel (27). Tooling prepreg sheets (34) are extended over the inner bagging film (28), and a outer bagging film (40) is extended over the tooling prepreg sheets (34). Reduced vacuum is applied to the inner bagging film (28), and full vacuum is applied to the outer bagging film (40). The tooling prepreg sheets (34) are then partially cured so that they harden into the shape of the inner mold line of the honeycomb core sandwich panel (27). The partially cured tooling prepreg sheets (34) are then final cured to form the caul plate (14). The caul plate (14) can then be used for inner mold line tooling for the honeycomb core sandwich panel (27) or parts having the same inner mold line shape.

20 Claims, 4 Drawing Sheets

METHOD FOR FORMING INNER MOLD LINE TOOLING WITHOUT A PART MODEL

FIELD OF THE INVENTION

This invention is directed to forming of composite tooling, and more specifically, is directed to a method for forming a composite inner mold line caul plate without a part model.

BACKGROUND OF THE INVENTION

Airplane manufacturers are under increasing pressure to produce lightweight, strong, and durable aircraft at the lowest cost for manufacture and lifecycle maintenance. An airplane or helicopter must have sufficient structural strength to withstand stresses during flight, while being as light as possible to maximize the performance of the aircraft. To address these concerns, aircraft manufacturers have increasingly used fiber-reinforced resin matrix composites.

Fiber-reinforced resin matrix composites provide improved strength, fatigue resistance, stiffness, and strength-to-weight ratio by incorporating strong, stiff, carbon fibers into a softer, more ductile resin matrix. The resin matrix material transmits forces to the fibers and provides ductility and toughness, while the fibers carry most of the applied force. Unidirectional continuous fibers can produce anisotropic properties, while woven fabrics produce quasi-isotropic properties. Honeycomb core is often sandwiched between composite sheets to provide stiff honeycomb core sandwich panels having the highest specific strength.

To form a honeycomb core sandwich panel, prior art methods used a lay-up mandrel. A composite outer skin, usually a lay-up of prepreg sheets, was laid against the upper surface of the lay-up mandrel, and a honeycomb core was laid over the outer composite skin. A composite inner skin, also usually a lay-up of prepreg sheets, was then arranged over the honeycomb core, and the three layers were bagged and cured so as to form the honeycomb core sandwich panel.

Tolerances at the outer mold line (i.e., the outer side of the composite outer skin) of honeycomb core sandwich panels formed by this method were near exact because the outer mold line was formed against the upper surface of the lay-up mandrel. However, this method did not provide index control for the inner mold line (i.e., bagside) of the composite inner skin. Inexact tolerances at the inner mold line made locating and attaching details on the inner surface of the honeycomb core sandwich panel difficult. Another problem encountered in formation of the honeycomb core sandwich panels was crushing of the honeycomb core caused by the application of high pressure and vacuum during curing.

Multistage curing was one prior art process for avoiding core crush. Multistage curing consisted of bonding the honeycomb core sandwich panel together one element at a time and curing or pre-curing the assembly after each element was added. Although crushing of the honeycomb core was generally avoided, higher cost and risks were associated with this type of processing. For example, exposing the bonded assembly to multiple high-temperature cure cycles induced various degrees of shrinkage in the honeycomb core sandwich panel. Thermal expansion between the lay-up mandrel and the honeycomb core sandwich panel, as well as between the skins and the honeycomb core, also caused problems. The resultant stresses were proven to cause disbonding in the previously-cured bond interfaces.

In some prior art processes, tooling, for example, a caul plate, was used along the inner mold line of the composite inner skin. The caul plate helped to prevent crushing of the honeycomb core and helped to maintain tolerances at the inner mold line. Caul plates were especially desirable when honeycomb core sandwich panel was to be formed by co-curing the three layers of the honeycomb core sandwich panel, because core crush was most likely to occur during this type of process.

While co-curing with a caul plate was a preferred option for formation of a honeycomb core sandwich panel, fabricating a caul plate with conventional tooling methods was costly. Prior art caul plate fabrication required a physical model. In one prior art method, a part model was fabricated by bonding together epoxy or polyurethane modeling boards. The surfaces of the bonded epoxy and polyurethane modeling boards were then machined to match the inner mold line of the desired part. This process was costly and laborious.

Another type of model used in formation of caul plates was a pre-formed cured part made of the same or similar details as the final part to be formed. The pre-formed part was filled and sanded to achieve an acceptable model surface. Forming a model from a pre-formed part in this manner was labor intensive. Moreover, after the pre-formed part was used as a model, it could no longer be used for its intended purpose because the filling, sanding, and curing required to transform the part into a model and form a caul plate on the model caused the part to lose its integrity.

There exists a need for more efficient, less costly method of forming inner mold line tooling such as a caul plate. Preferably, the method can be used to form a caul plate that is to be used in formation of a honeycomb core sandwich panel.

SUMMARY OF THE INVENTION

The present invention provides a method of forming a caul plate for aligning against the inner mold line of a composite part. The method includes laying-up a first uncured composite material on a lay-up mandrel, the first uncured composite material having a first primary curing temperature. A nonporous film is extended over an inner mold line of the first uncured composite material. A second composite material is arranged over the nonporous film so as to form an assembly, the second composite material having a second primary curing temperature that is lower than the first primary curing temperature. The assembly is cured at a curing temperature that is at least as high as the second primary curing temperature but is less than the first primary curing temperature such that the second composite material is made substantially rigid, whereby the cured, second composite material can be used as a caul plate for the inner mold line of the first uncured composite material.

Preferably, curing the second composite material at the curing temperature results in partial curing of the second composite material. The cured, second composite material can be removed from the nonporous film and final-cured. The final-cured second composite material is arranged against the inner mold line of the first uncured composite material, and the first uncured composite material is cured. The second composite material serves as the inner mold line tooling for the first uncured composite material during curing.

The second composite material is preferably vacuum bagged in a first chamber prior to curing the second composite material. Vacuum is applied to the first chamber during curing. In accordance with one aspect of the present invention, the first uncured composite material comprises a honeycomb core sandwich panel having a honeycomb core. The nonporous film forms one side of the chamber. Vacuum applied to the chamber during curing is sufficient to draw the nonporous film into contact with the honeycomb core sandwich panel, but is not sufficient to crush the honeycomb core. In one embodiment, the vacuum applied to the chamber is less than ten inches of mercury.

In accordance with further aspects of the present invention, the first composite material is preferably vacuum bagged in a second chamber prior to curing the second composite material. Vacuum is applied to the second chamber during curing. Preferably, the second chamber is separate from the first chamber so that resin contamination does not occur during curing.

In accordance with another aspect of the present invention, the second composite material extends substantially over the first uncured composite material.

The present invention also provides a composite caul plate made in accordance with the methods described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
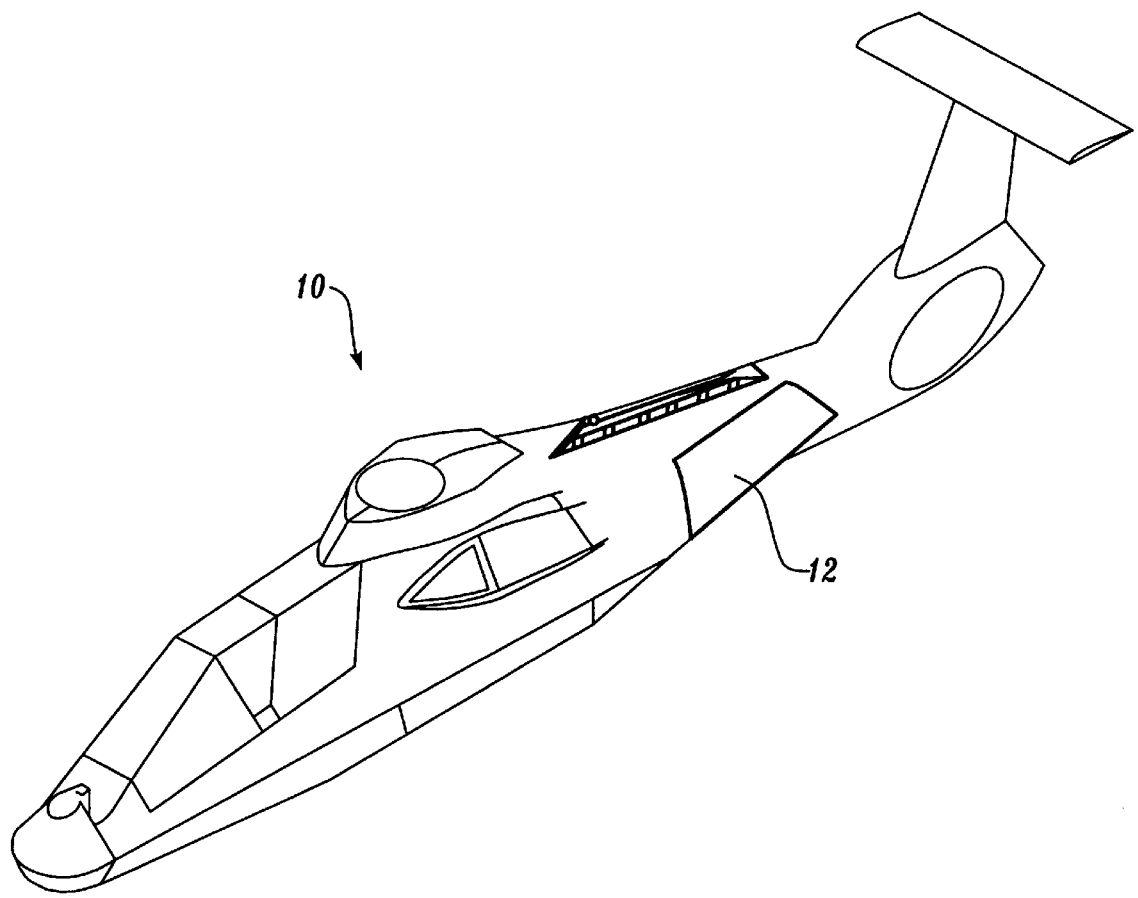
FIG. 1 is a side perspective view of a helicopter with the rotor removed for detail and having an exhaust door made in accordance with the present invention.

Referring now to the drawing, in which like reference numerals represent like parts throughout the several views, FIG. 1 shows a helicopter 10 having an exhaust door 12 formed in accordance with the present invention. The exhaust door 12 is located at the rear portion of the helicopter 10.

Figure 7:
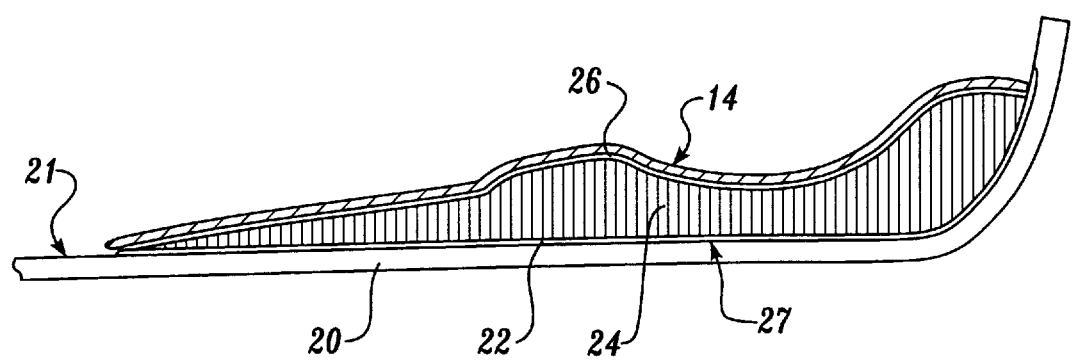
FIG. 7 is a diagrammatic view showing the caul plate of FIG. 6 placed against the inner mold line of the honeycomb core sandwich panel.

The present invention is directed to a method of forming a caul plate 14 (FIG. 7) for use in producing a composite part, for example, the exhaust door 12 on the helicopter 10. However, it is to be understood that the method described could be used to produce a caul plate for forming a composite part for any portion of a helicopter 10, or to produce a composite caul plate for any other purpose or application. The present invention has particular relevance, however, to formation of a caul plate for a honeycomb core sandwich panel.

In summary, the caul plate 14 is formed on the inner mold line of an uncured composite part, such as an uncured composite honeycomb core sandwich panel 27. The uncured honeycomb core sandwich panel 27 is laid-up on a lay-up mandrel 20. An inner bagging film 28 is then extended over the uncured honeycomb core sandwich panel 27. Uncured composite material that is to be used in forming the caul plate, such as tooling prepreg sheets 34, is extended over the inner bagging film 28, and a outer bagging film 40 is extended over the tooling prepreg sheets 34. Reduced vacuum is applied to the inner bagging film 28, and full vacuum is applied to the outer bagging film 40. The tooling prepreg sheets 34 are then staged, or partially cured, so that they harden into the shape of the inner mold line of the honeycomb core sandwich panel 27. The partially cured tooling prepreg sheets 34 are then final cured to form the caul plate 14. The caul plate 14 can then be used for inner mold line tooling for the honeycomb core sandwich panel 27 or parts having the same inner mold line shape.

Figure 2:
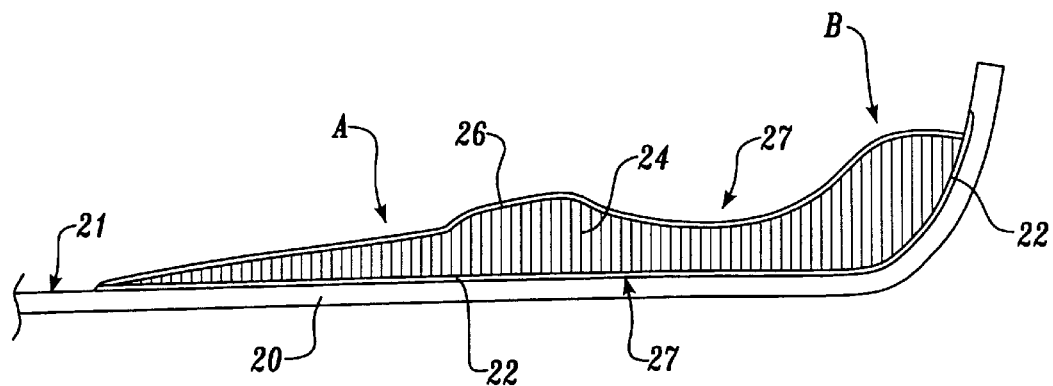
FIG. 2 is diagrammatic view of a lay-up of a honeycomb core sandwich panel for use in forming the helicopter exhaust door of FIG. 1.

Referring now in more detail, the exhaust door 12 is formed on a lay-up mandrel 20 (shown in FIG. 2) having an upper face 21. The lay-up mandrel 20 can be formed of a composite or metallic material, but preferably is formed of a material which has a coefficient of thermal expansion that is substantially the same as the coefficient of thermal expansion of the composite material used to form the exhaust door 12. Matching the coefficients of thermal expansion between the material used for the lay-up mandrel 20 and the composite material from which the exhaust door 12 is formed reduces problems associated with thermal expansion mismatches during part curing.

The upper face 21 of the lay-up mandrel 20 has a contour that substantially matches the outer surface of the final product to be formed; i.e., the exhaust door 12. This outer surface of the product to be formed will be referred to herein as the "outer mold line."

Formation of the exhaust door 12 begins by arranging an outer skin 22 onto the upper face 21 of the lay-up mandrel 20. The outer skin 22 is preferably formed by a stack of prepreg sheets (not shown in detail in the drawing, but well-known in the art). The prepreg sheets preferably include interwoven carbon fiber fabric impregnated with a polymer matrix. The polymer matrix is preferably bismaleimide (BMI) resin, and the fibers are preferably carbon fiber. However, the outer skin 22 may be formed from various composite materials, including composite prepreg sheets having an epoxy or another resin matrix reinforced with either unidirectional or cloth fibers, such as fiberglass, silicon carbide, or Kevlar®.

After the outer skin 22 is arranged on the upper face 21 of the lay-up mandrel 20, a honeycomb core 24 is laid over the outer skin 22. The honeycomb core 24 is preferably a fiberglass over-expanded core with polyimide resin. After the honeycomb core 24 is laid over the outer skin 22, an inner skin 26 is arranged over the honeycomb core 24. As with the outer skin 22, prepreg sheets (not shown in detail) preferably form the inner skin 26. Preferably, the material composition for the inner skin 26 is substantially identical to the material composition for the outer skin 22. The outer skin 22, the honeycomb core 24, and the inner skin 26 form a honeycomb core sandwich panel 27.

A strip of breather cloth 29 is arranged around the perimeter of the honeycomb core sandwich panel 27. The breather cloth 29 extends against the upper face 21 of the lay-up mandrel 20, but not over the honeycomb core sandwich panel 27. Once the breather cloth 29 is in place, an inner bagging film 28 is arranged over the inner skin 26 and the breather cloth 29. The inner bagging film 28 is preferably a non-porous parting film, such as a film of 2 mil fluorinated ethylene propylene (FEP).

A plurality of vacuum ports 30 (only one of which is shown in the drawing) extend through the outer circumference of the inner bagging film 28. The vacuum ports 30 preferably are located just outside the outer perimeter of the honeycomb core sandwich panel 27 so that they contact the breather cloth 29.

The inner bagging film 28 is attached to the upper face 21 of the lay-up mandrel 20 by an inner sealant tape 32. The inner sealant tape 32 extends a few inches outside the outer perimeter of the breather cloth 29. The inner sealant tape 32 is preferably nylon bagging tape, but any type of appropriate sealant can be used.

The inner bagging film 28 is tightly drawn over the upper side (hereinafter "inner mold line") of the inner skin 26 and into intimate contact with the inner skin so that the inner bagging film does not have any wrinkles. After the inner bagging film 28 is tightly drawn in place, the outer edges of the inner bagging film 28 are pressed against the inner sealant tape 32. The sealed inner bagging film 28 forms a chamber around the honeycomb core sandwich panel 27. The vacuum ports 30 provide fluid connection to the chamber from outside the chamber.

Vacuum hoses (not shown, but well-known in the art) are connected to the vacuum ports 30 and light vacuum is applied to the inner bagging film 28 so that the inner bagging film is drawn into intimate contact with the honeycomb core sandwich panel 27. Preferably, vacuum is applied at approximately 5 to 10 inches of mercury. This amount of vacuum is sufficient to pull the inner bagging film 28 snugly against the honeycomb core sandwich panel 27, but does not crush the honeycomb core 24.

Figure 3:
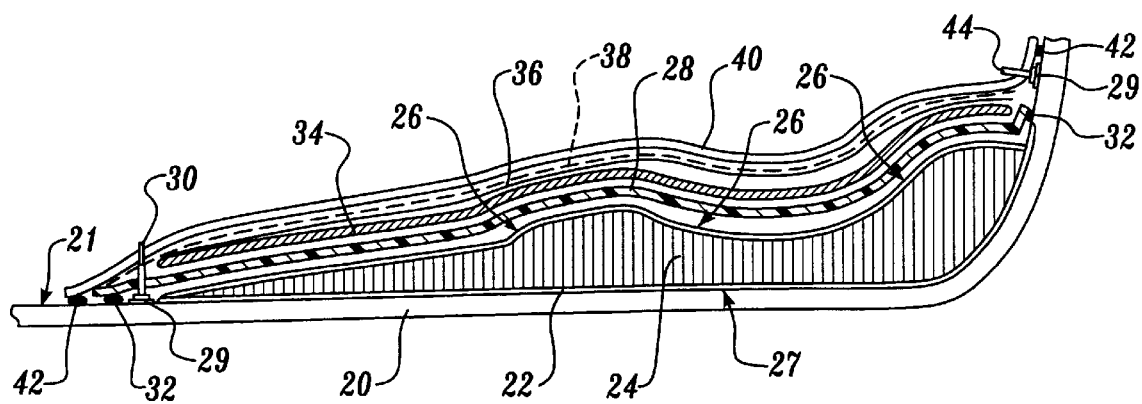
FIG. 3 is a diagrammatic view of the lay-up of FIG. 2, shown in a further stage of assembly in which an inner bagging film is added over the honeycomb core sandwich panel, uncured tooling prepreg sheets that eventually form a caul plate are added over the inner bagging film, and an outer bagging film is added over the tooling prepreg sheets.
Figure 5:
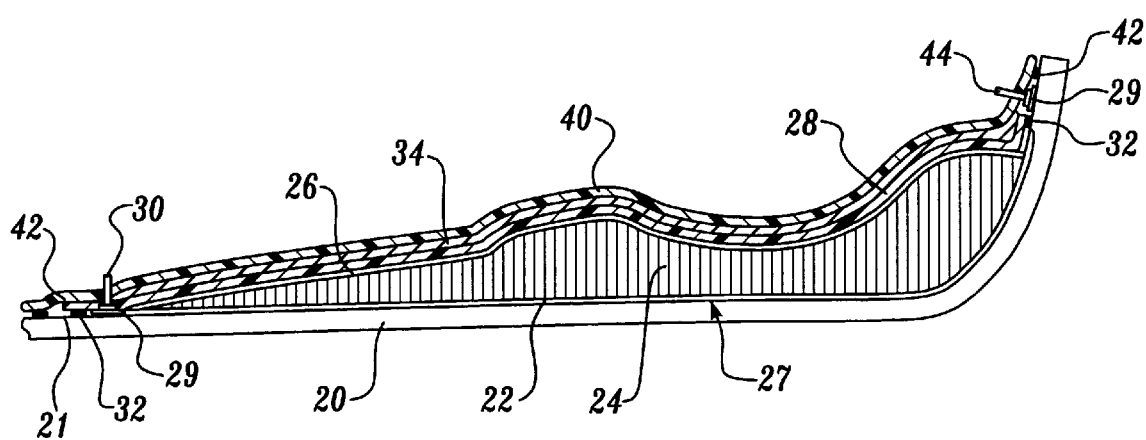
FIG. 5 is a diagrammatic view showing a further stage of assembly in which vacuum is applied to the inner and outer bagging films.

While maintaining light vacuum, multiple layers of uncured tooling prepreg sheets 34 (shown as one unit in FIGS. 3 and 5) are arranged over the upper surface of the inner bagging film 28. The uncured tooling prepreg sheets 34 are eventually cured to form the caul plate 14, as is described in detail below. The uncured tooling prepreg sheets 34 are compacted onto the inner bagging film 28 to reduce air entrapment. The fibers within the tooling prepreg sheets 34 are preferably selected to match the fiber in the final part to be formed so that the thermal expansion of the tooling prepreg sheets 34 will be the same as the part to be formed. The resin for the uncured tooling prepreg sheets 34 has a primary curing temperature lower than the curing temperature for the composite material used to form the honeycomb sandwich panel. A "primary curing temperature" as used herein is the lowest temperature at which the resin for the composite material undergoes polymerization. In the preferred embodiment, the primary curing temperature of the resin for the tooling prepreg sheets 34 is 150° F. or less. An example of a material having a primary curing temperature (actually, a staged cure temperature) at this temperature or below is Low Temperature Molding (LTM) resin, which is manufactured by Advanced Composites Group of Tulsa, Okla. LTM is an epoxy commonly used to fabricate composite tooling. LTM resin achieves a primary stage cure at 120° F. to 150° F., in which it achieves a rigid shape. LTM resin is final cured at 400° F. to achieve its full mechanical properties.

Figure 4:
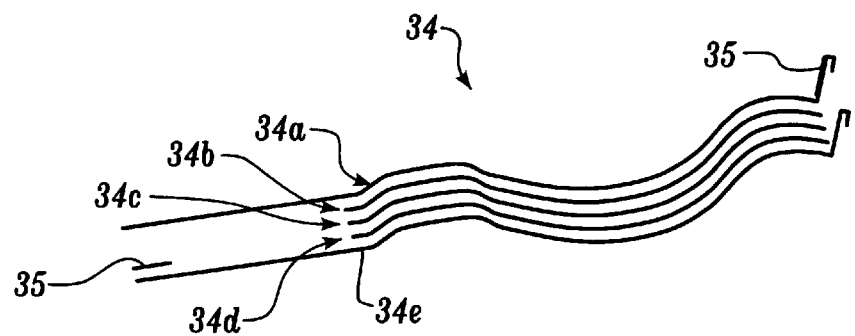
FIG. 4 shows a diagrammatic view of a lay-up of the uncured tooling prepreg sheets in FIG. 3.

Additional layers of the uncured tooling prepreg sheets 34 are stacked and arranged at some locations so as to achieve desired stiffness in critical areas and so as to prevent crushing of the honeycomb core 24 during part curing cycles. Part geometry and components determine where stiffness or compliance is required for any given composite part. For example, in the honeycomb core sandwich panel 27 shown in FIG. 2, the portion of the uncured tooling prepreg sheets 34 that needs reinforcement is located approximately between the arrows A and B. In the embodiment of the lay-up for the uncured prepreg sheets shown in FIG. 4, three additional uncured tooling prepreg sheets 34b–d are stacked in these areas. Only two uncured tooling prepreg sheets 34a, 34e extend over the entire part. The number of tooling prepreg sheets 34 arranged in each area is determined by the amount of reinforcement needed in a location. The uncured tooling prepreg sheets 34 can also include tooling holes (not shown), and build-up 35 for the tooling holes, so that the caul plate 14 can be properly aligned with the lay-up mandrel during subsequent part formation.

Preferably, the uncured tooling prepreg sheets 34 are of sufficient size so that the caul plate 14 covers the entire honeycomb core sandwich panel 27. If the caul plate 14 does not extend over the entirety of the honeycomb core sandwich panel, some creep can occur in the honeycomb core 24 during curing.

A parting film 36 (shown only in FIG. 3), such as FEP, is arranged over the tooling prepreg sheets 34. A breather cloth 38 (shown by the dotted line in FIG. 3) is arranged over the parting film 35 so that the breather cloth extends outward beyond the edge of the inner sealant tape 32. An outer bagging film 40 is arranged over the breather cloth and is attached at its outer perimeter to the upper surface 21 of the lay-up mandrel 20 by an outer sealant tape 42. The outer bagging film 40 includes a plurality of vacuum ports 44 (only one is shown in the drawing) extending therethrough. The vacuum ports 44 are located outside the perimeter of the inner sealant tape 32 and contact the breather cloth 36. The sealed outer bagging film 40 and the upper side of the inner bagging film 28 form a chamber in which the tooling prepreg sheets 34 are sealed. The vacuum ports 44 provide a fluid connection to underneath the chamber.

Vacuum is applied through the vacuum ports 44 and is held. The entire assembly is then placed in an oven and the tooling prepreg sheets 34 are partially cured, or made rigid, while vacuum is applied to the outer bagging film 40 and light vacuum is applied to the inner bagging film 28. The vacuum applied to the outer bagging film 40 is the amount needed for consolidation of the tooling prepreg sheets (approximately 28 inches of mercury), and the amount of vacuum applied to the inner bagging film 28 is sufficient to hold the inner bagging film firmly against the honeycomb core sandwich panel, but is not so much as to crush the honeycomb core 24 (approximately 5 to 10 inches of mercury). The assembly is heated to the low temperature first-stage cure temperature range (as described above, preferably 150° F. or less) of the tooling prepreg sheets 34 so that the tooling prepreg sheets 34 are partially cured and made rigid.

Since composite specifications generally allow for hot compactions of the materials used for the honeycomb core sandwich panel 27 at 150° F. or below, subjecting the honeycomb core sandwich panel to this temperature during the first-stage cure process of the caul plate 14 does not advance the resin system of the honeycomb core sandwich panel 27. By providing the inner bagging film 28 between the honeycomb core sandwich panel 27 and the tooling prepreg sheets 34, cross-contamination between the tooling prepreg sheets 34 and the resin for the honeycomb core sandwich panel 27 is avoided.

The tooling prepreg sheets 34 are held tightly against the outer surface of the inner bagging film 28 during the first stage curing. Because the inner bagging film 28 is pulled tightly against inner mold line of the honeycomb core sandwich panel 27 and the inner bagging film 28 is arranged against the honeycomb core sandwich panel 27 with substantially no wrinkles, the lower surface of the caul plate 14 substantially matches the inner mold line of the honeycomb core sandwich panel.

Figure 6:
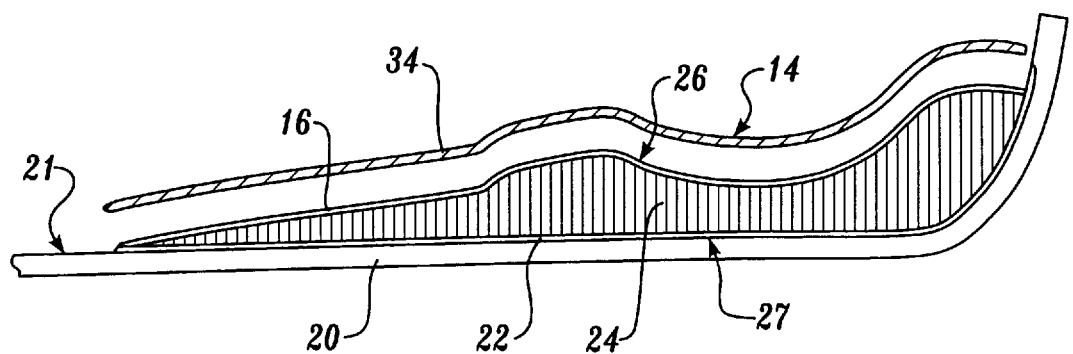
FIG. 6 is a diagrammatic view showing a formed caul plate removed from the inner and outer bagging films.

After the first stage cure of the tooling prepreg sheets 34, the inner and outer bagging films 28, 40 are removed from the assembly, and the partially cured, rigid tooling prepreg sheets 34 are removed. As can be seen in FIG. 6, the partially cured tooling prepreg sheets 34 rigidly maintain the shape of the inner mold line for the honeycomb core sandwich panel 27. The partially cured prepreg sheets 34 are then placed in an oven for final cure. For the LTM material used in the preferred embodiment of the invention, the final cure occurs at 350° F. to 400° F. The finally-cured tooling prepreg sheets 34 form the caul plate 14.

Once the caul plate 14 is formed, it is arranged against the inner mold line of the honeycomb core sandwich panel 27 for a co-cure cycle for the honeycomb core sandwich panel. The caul plate 14 provides adequate stiffness at common epoxy cure temperatures (350° F.) to protect the honeycomb core 24 in the honeycomb core sandwich panel 27 from movement or crush during the forty (40) to forty-five (45) PSI required cure cycle. The caul plate 14 can then be used for numerous other part runs.

The present invention provides many advantages over prior art methods of producing inner mold line tooling for a composite part. The caul plate 14 of the present invention is formed on the uncured part to be made; that is, the uncured honeycomb core sandwich panel 27. Thus, a model of the part does not have to be developed in order to form the inner mold line tooling; i.e., the caul plate 14. In addition, since the part (the honeycomb sandwich panel 27) is used to form the caul plate 14, a precise fit-up between the part and the caul plate is ensured.

While the preferred embodiment of the invention has been illustrated and described, it will be appreciated that various changes can be made therein without departing from the spirit and scope of the invention as defined in the appended claims.

The embodiments of the invention in which an exclusive property or privilege is claimed are defined as follows:

1. A method of forming a caul plate for aligning against the inner mold line of a composite part, comprising:
   laying-up a first uncured composite material on a lay-up mandrel, the first uncured composite material having a first primary curing temperature;
   extending a nonporous film over an inner mold line of the first uncured composite material;
   arranging a second composite material over the nonporous film so as to form an assembly, the second composite material having a second primary curing temperature that is lower than the first primary curing temperature; and
   curing the assembly at a curing temperature that is at least as high as the second primary curing temperature but is less than the first primary curing temperature such that the second composite material is made substantially rigid, whereby the cured, second composite material can be used as a caul plate for the inner mold line of the first uncured composite material.

2. The method of claim 1, wherein curing the second composite material at the curing temperature results in partial curing of the second composite material, and further comprising removing the cured, second composite material from the nonporous film and final curing the second composite material.

3. The method of claim 2, further comprising arranging the final-cured second composite material against the inner mold line of the first uncured composite material and curing the first uncured composite material.

4. The method of claim 1, further comprising vacuum bagging the second composite material in a first chamber prior to curing the second composite material, and applying vacuum to the first chamber during curing.

5. The method of claim 4, further comprising vacuum bagging the first composite material in a second chamber prior to curing the second composite material, and applying vacuum to the second chamber during curing, the second chamber being separate from the first chamber.

6. The method of claim 1, further comprising vacuum bagging the first composite material in a chamber prior to curing the second composite material, and applying vacuum to the chamber during curing.

7. The method of claim 6, wherein the first uncured composite material comprises a honeycomb core sandwich panel having a honeycomb core, the nonporous film comprises one side of the chamber, and wherein the vacuum applied to the chamber during curing is sufficient to draw the nonporous film into contact with the honeycomb core sandwich panel, but is not sufficient to crush the honeycomb core.

8. The method of claim 7, wherein the vacuum applied to the chamber is less than ten inches of mercury.

9. The method of claim 1, wherein the first uncured composite material is an uncured honeycomb core sandwich panel.

10. The method of claim 1, further comprising arranging the second composite material against the inner mold line of the first uncured composite material and curing the first uncured composite material.

11. The method of claim 1, wherein the second composite material extends substantially over the first uncured composite material.

12. A method of forming a caul plate for aligning against the inner mold line of a composite honeycomb core sandwich panel, comprising:
   laying-up an uncured composite honeycomb core sandwich panel having a honeycomb core on a lay-up mandrel, the uncured composite honeycomb core sandwich panel having a first primary curing temperature;
   extending a nonporous film over an inner mold line of the uncured composite honeycomb core sandwich panel;
   arranging a second composite material over the nonporous film so as to form an assembly, the second composite material having a second primary curing temperature that is lower than the first primary curing temperature; and
   curing the assembly at a curing temperature that is at least as high as the second primary curing temperature but is less than the first primary curing temperature such that the second composite material is made substantially rigid, whereby the cured, second composite material can be used as a caul plate for the inner mold line of the uncured composite honeycomb core sandwich panel.

13. The method of claim 12, wherein curing the second composite material at the curing temperature results in partial curing of the second composite material, and further comprising removing the cured, second composite material from the nonporous film and final curing the second composite material.

14. The method of claim 13, further comprising arranging the final-cured second composite material against the inner mold line of the uncured composite honeycomb core sandwich panel and curing the uncured composite honeycomb core sandwich panel.

15. The method of claim 12, further comprising vacuum bagging the second composite material in a first chamber prior to curing the second composite material, and applying vacuum to the first chamber during curing.

16. The method of claim 15, further comprising vacuum bagging the uncured composite honeycomb core sandwich panel in a second chamber prior to curing the second composite material, and applying vacuum to the second chamber during curing, the second chamber being separate from the first chamber.

17. The method of claim 12, further comprising vacuum bagging the uncured composite honeycomb core sandwich panel in a chamber prior to curing the second composite material, and applying vacuum to the chamber during curing.

18. The method of claim 17, wherein the nonporous film comprises one side of the chamber, and wherein the vacuum applied to the chamber during curing is sufficient to draw the nonporous film into contact with the uncured composite honeycomb core sandwich panel, but is not sufficient to crush the honeycomb core.

19. The method of claim 12, further comprising arranging the second composite material against the inner mold line of the uncured composite honeycomb core sandwich panel and curing the uncured composite honeycomb core sandwich panel.

20. The method of claim 12, wherein the second composite material extends substantially over the uncured composite honeycomb core sandwich panel.

* * * * *